Patented July 21, 1931

1,815,143

UNITED STATES PATENT OFFICE

WILLY EICHHOLZ, OF MANNHEIM, GERMANY, ASSIGNOR TO GENERAL ANILINE WORKS, INC., OF NEW YORK, N. Y., A CORPORATION OF DELAWARE

DERIVATIVES OF BENZANTHRONE

No Drawing. Application filed December 7, 1928, Serial No. 324,583, and in Germany March 12, 1928.

The present invention relates to the production of 2-alkylbenzanthrones.

I have found that 2-alkylbenzanthrones are obtained by treating benzanthrones in which the radicle

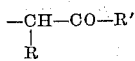

(R and R' stand for hydrocarbon radicles and R may also be hydrogen), is connected to the 2-position of a benzanthronyl residue by means of a sulfur atom with alkaline saponifying agents. The benzanthronyl residue as well as the hydrocarbon radicles may contain any other substituents. The treatment may be carried out by heating or boiling the initial material with, for example, an alcoholic or aqueous solution or suspension of a caustic alkali or with a weak alkaline agent, such as the hydroxides of the alkaline earth metals or the sulfides of the alkali metals. The reaction proceeds in accordance with the following scheme:

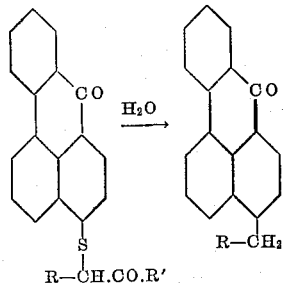

The following examples will further illustrate the nature of the invention, but the invention is not restricted to these examples. The parts are by weight.

Example 1

5 parts of acetonyl-2-benzanthronylsulfide (obtainable as yellow needles, for example, by the action of monochloracetone on 2-mercaptobenzanthrone, the latter to be prepared by treating 2-chlorbenzanthrone with sodium sulfide in alcoholic solution, in aqueous alkaline solution and by crystallization from pyridine) are slowly introduced at 100° C., while stirring, into a melt of 10 parts of potassium hydroxid and 2 parts of water, and the mixture is heated at 125° to 130° C. for a time. The reaction mixture is poured into water, and the reaction product which is insoluble in water is subjected to sublimation in vacuo. 2-methylbenzanthrone is thus obtained which can readily be purified by crystallization from alcohol.

Example 2

5 parts of acetonyl-2-benzanthronylsulfide are heated to boiling for several hours with a solution of 5 parts of potassium hydroxid in 100 parts of ethyl alcohol, and, after cooling, the crude 2-methylbenzanthrone which separates out is filtered with suction. The product may be purified, for example, by sublimation in vacuo.

Example 3

5 parts of phenacyl-2-benzanthronylsulfide (obtainable by treating 2-mercaptobenzanthrone with phenacylbromid in alcoholic alkaline solution) are heated to boiling for 4 hours with 5 parts of potassium hydroxid and 50 parts of ethyl alcohol. The whole is then diluted with water and the precipitated 2-methylbenzanthrone recrystallized from ethyl alcohol.

Example 4

A mixture of 5 parts of acetonyl-2-benzanthronylsulfide, 100 parts of ethyl alcohol and 5 parts of sodium hydroxid is heated to boiling for several hours. After cooling the precipitated crude-2-methylbenzanthrone is filtered with suction and may be purified by sublimation or crystallization.

Example 5

5 parts of acetonyl-2-benzanthronylsulfide are boiled, until complete saponification has taken place, in 100 parts of ethyl alcohol with 5 parts of anhydrous sodium sulfide. The reaction product is worked up as described in the foregoing example.

What I claim is:—

1. A process for the production of 2-alkylbenzanthrones, which comprises treating a benzanthrone derivative corresponding to the general formula:

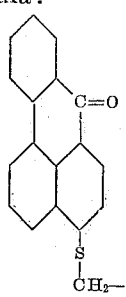

in which R' stands for a hydrocarbon radicle which may be substituted with an alkaline saponifying agent.

2. A process for the production of 2-alkyl-benzanthrones, which comprises treating a benzanthrone derivative corresponding to the general formula:

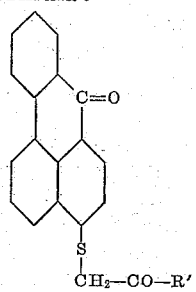

in which R' stands for a hydrocarbon radicle which may be substituted with a caustic alkaline saponifying agent.

3. A process for the production of 2-alkyl-benzanthrones, which comprises treating a benzanthrone derivative corresponding to the general formula:

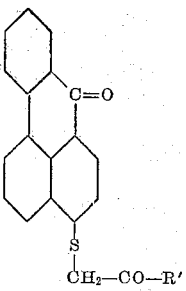

in which R' stands for a hydrocarbon radicle which may be substituted with an alcoholic caustic alkali.

4. The process of producing 2-methyl-benzanthrone, which comprises treating the benzanthrone derivative of the formula:

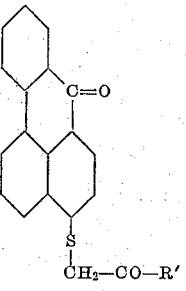

in which R' stands for an alky- or aryl group, with an alkaline saponifying agent.

5. The process of producing 2-methyl-benzanthrone, which comprises treating the benzanthrone derivative of the formula:

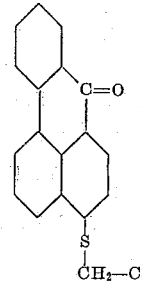

with alcoholic caustic potash.

In testimony whereof I have hereunto set my hand.

WILLY EICHHOLZ.